(12) United States Patent
Carl

(10) Patent No.: US 11,787,475 B2
(45) Date of Patent: Oct. 17, 2023

(54) SUPERSTRUCTURE ARRANGEMENT FOR A MOTOR VEHICLE SHELL CONSTRUCTION

(71) Applicant: Daimler AG, Stuttgart (DE)

(72) Inventor: Michael Carl, Gerlingen (DE)

(73) Assignee: Daimler AG, Stuttgart (DE)

( * ) Notice: Subject to any disclaimer, the term of this patent is extended or adjusted under 35 U.S.C. 154(b) by 239 days.

(21) Appl. No.: 17/296,021

(22) PCT Filed: Oct. 11, 2019

(86) PCT No.: PCT/EP2019/077554
§ 371 (c)(1),
(2) Date: May 21, 2021

(87) PCT Pub. No.: WO2020/104105
PCT Pub. Date: May 28, 2020

(65) Prior Publication Data
US 2022/0009554 A1    Jan. 13, 2022

(30) Foreign Application Priority Data

Nov. 22, 2018   (DE) .................... 10 2018 009 196.2

(51) Int. Cl.
*B62D 21/15* (2006.01)
*B62D 21/02* (2006.01)
(Continued)

(52) U.S. Cl.
CPC ........... *B62D 21/152* (2013.01); *B62D 21/02* (2013.01); *B62D 21/11* (2013.01); *B62D 25/082* (2013.01)

(58) Field of Classification Search
CPC ...... B62D 21/02; B62D 21/11; B62D 21/152; B62D 25/08; B62D 25/082
See application file for complete search history.

(56) References Cited

U.S. PATENT DOCUMENTS

| | | | |
|---|---|---|---|
| 8,408,566 B2 | 4/2013 | Teichmann et al. | |
| 2009/0212521 A1* | 8/2009 | Steffens | B62D 25/082 |
| | | | 280/124.109 |

(Continued)

FOREIGN PATENT DOCUMENTS

| | | |
|---|---|---|
| CN | 101327811 A | 12/2008 |
| CN | 102039933 A | 5/2011 |

(Continued)

OTHER PUBLICATIONS

PCT/EP2019/077554, International Search Report dated Jan. 16, 2020 (Two (2) pages).

(Continued)

*Primary Examiner* — Lori Lyjak
(74) *Attorney, Agent, or Firm* — Crowell & Moring LLP

(57) ABSTRACT

A superstructure arrangement of a motor vehicle shell construction of a motor vehicle includes a superstructure with first and second longitudinal girders running in a longitudinal direction of the motor vehicle. An auxiliary frame is fixed on the motor vehicle shell construction and is disposed below the first and second longitudinal girders and includes first and second longitudinal elements which diverge from each other from a back to a front in the longitudinal direction of the motor vehicle. A first front end region of the first longitudinal element juts out beyond the first longitudinal girder on a first outside in a transverse direction of the motor vehicle and a second front end region of the second longitudinal element juts out beyond the second longitudinal girder on a second outside in the transverse direction of the motor vehicle.

9 Claims, 7 Drawing Sheets

(51) Int. Cl.
 *B62D 21/11* (2006.01)
 *B62D 25/08* (2006.01)

(56) References Cited

U.S. PATENT DOCUMENTS

| | | |
|---|---|---|
| 2017/0120850 A1 | 5/2017 | Sugano et al. |
| 2018/0312198 A1 | 11/2018 | Shimizu |

FOREIGN PATENT DOCUMENTS

| | | | | |
|---|---|---|---|---|
| CN | 104203724 A | * | 12/2014 | ............. B62D 21/11 |
| CN | 108349538 A | * | 7/2018 | ............. B62D 21/11 |
| CN | 108349539 A | * | 7/2018 | ............... B60K 5/12 |
| CN | 108657280 A | * | 10/2018 | ............. B62D 21/11 |
| DE | 10 2008 006 006 A1 | | 7/2009 | |
| DE | 102008038715 A1 | * | 2/2010 | ............. B62D 21/02 |
| DE | 10 2009 050 495 A1 | | 4/2011 | |
| DE | 202012104070 U1 | * | 1/2013 | |
| DE | 11 2013 001 681 T5 | | 1/2015 | |
| EP | 2 921 377 A1 | | 9/2015 | |
| EP | 3 398 837 A1 | | 11/2018 | |
| FR | 2940238 A1 | * | 6/2010 | ............. B62D 21/11 |
| FR | 2945017 A1 | * | 11/2010 | ............. B62D 21/11 |
| GB | 2491949 A | * | 12/2012 | ............. B62D 21/11 |
| JP | 2007-245859 A | | 9/2007 | |

OTHER PUBLICATIONS

German-language German Office Action issued in German application No. 10 2018 009 196.2 dated Jun. 25, 2019 (Six (6) pages).
Chinese Office Action issued in Chinese application No. 201980076848.3 dated Sep. 20, 2022, with partial English translation (Ten (10) pages).

* cited by examiner

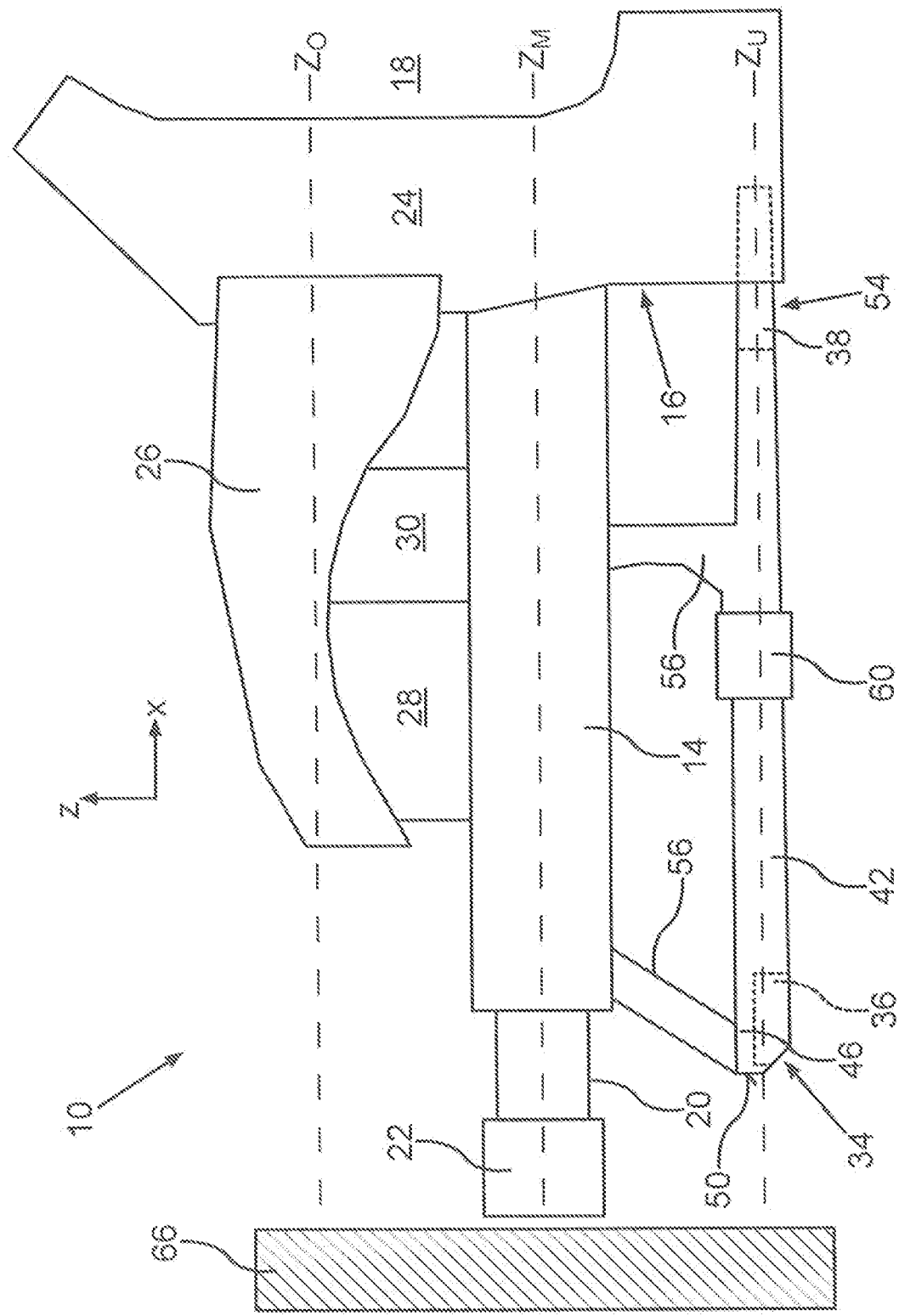

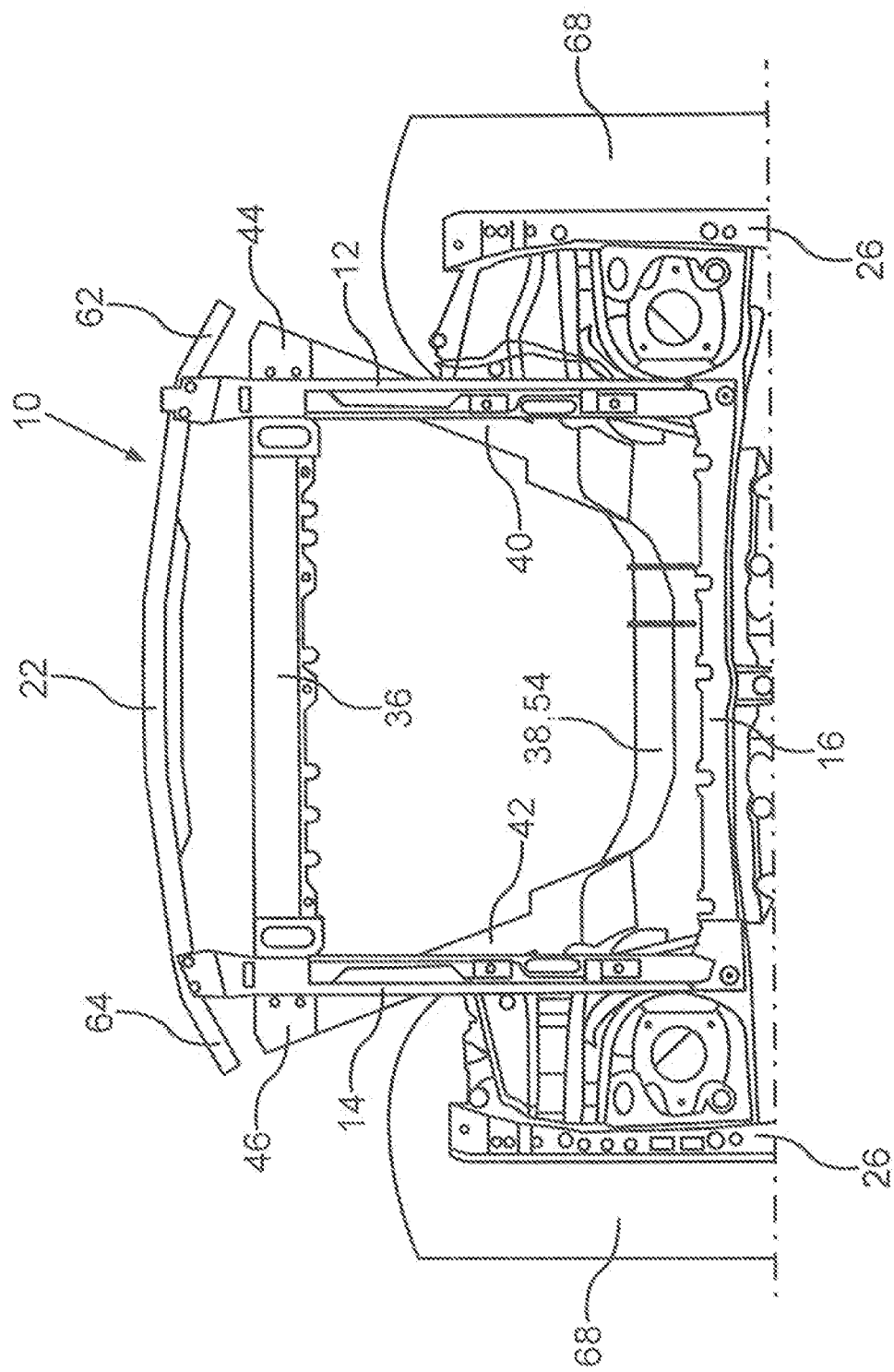

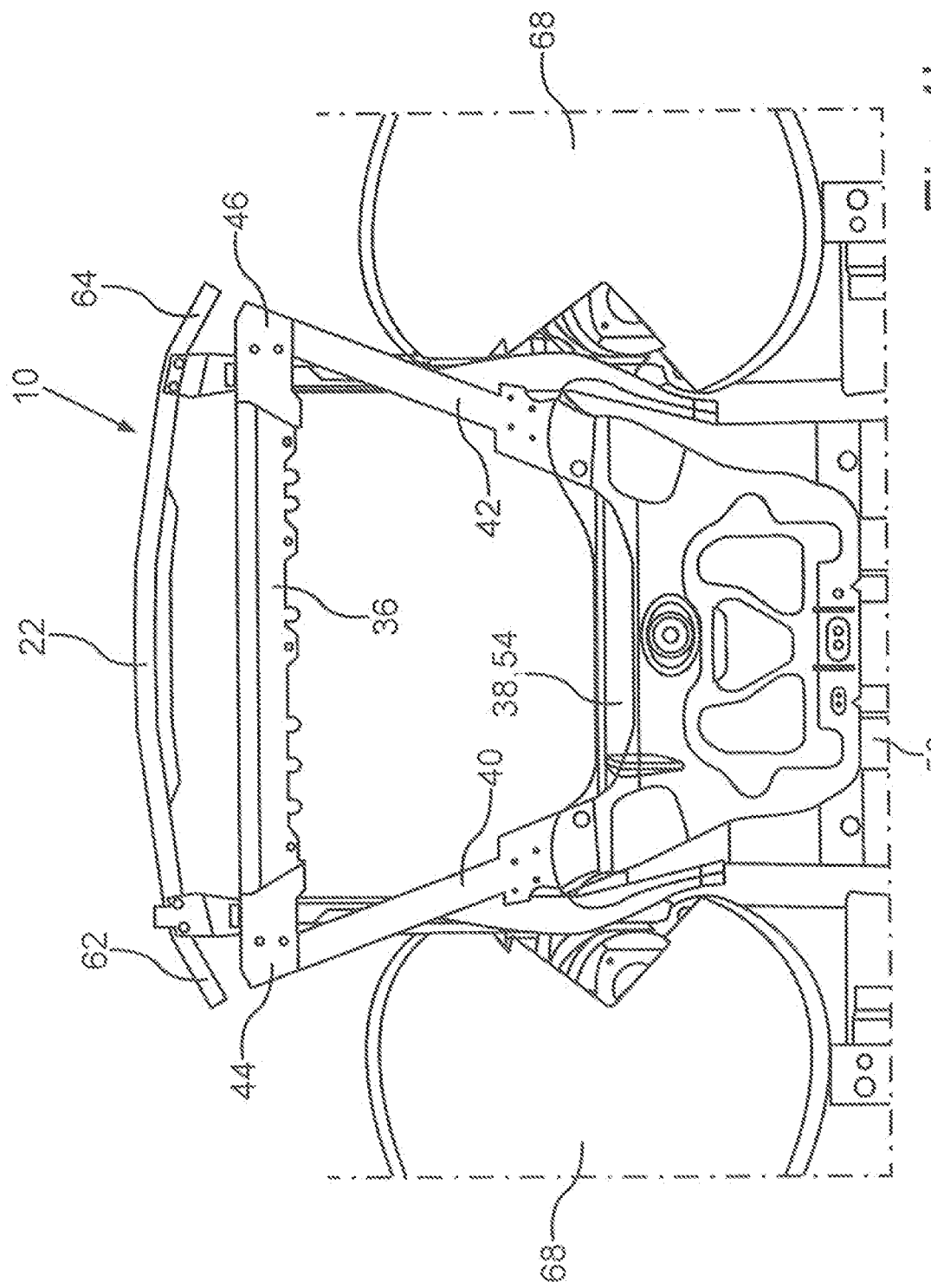

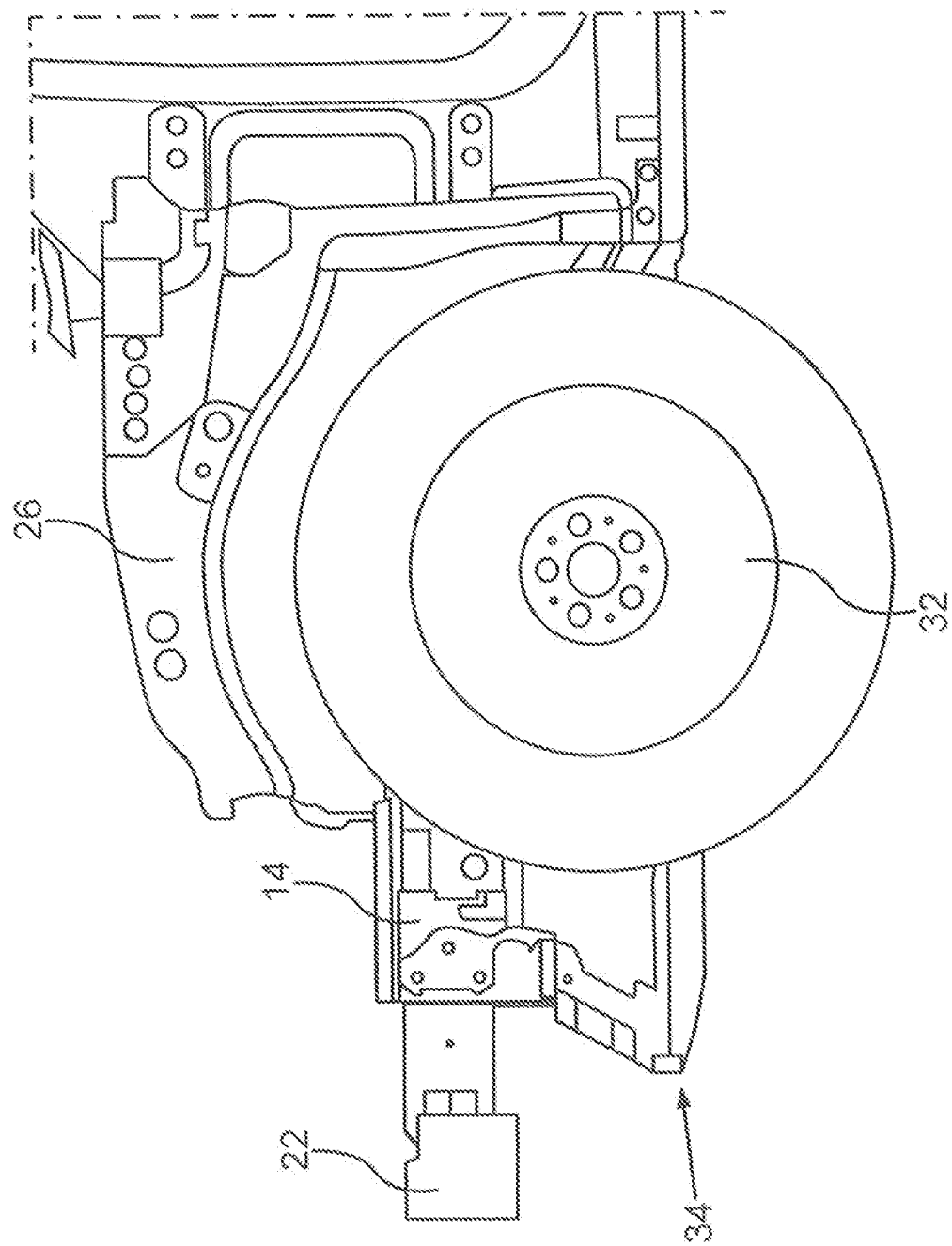

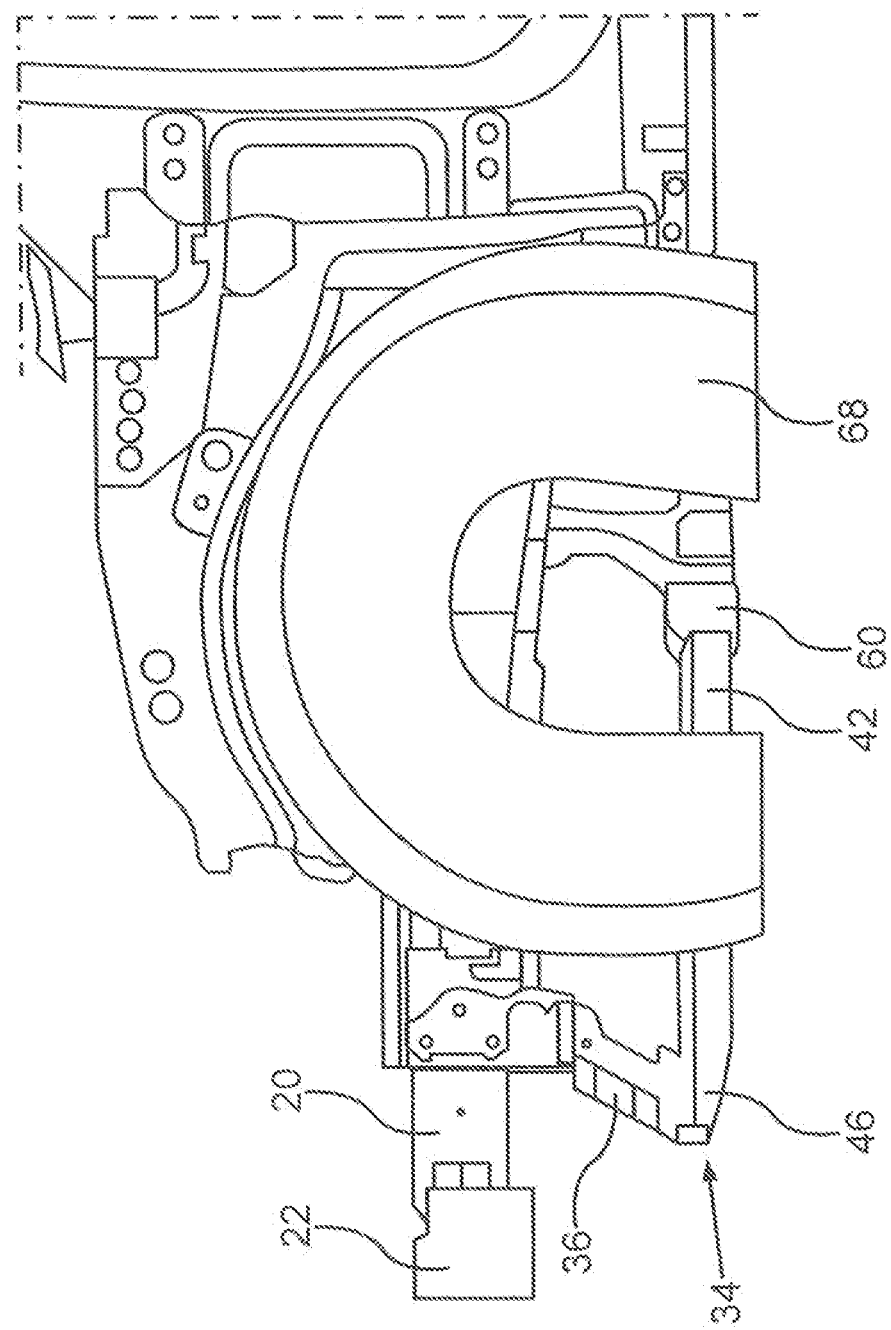

SUPERSTRUCTURE ARRANGEMENT FOR A MOTOR VEHICLE SHELL CONSTRUCTION

BACKGROUND AND SUMMARY OF THE INVENTION

The invention relates to a superstructure arrangement for a motor vehicle shell construction.

A superstructure arrangement emerges from DE 11 2013 001 681 T5, in which a superstructure of the motor vehicle shell construction comprises two longitudinal girders running in parallel to each other and at a distance apart from each other, which are connected to each other on their front ends via a crossmember. Furthermore, the superstructure arrangement comprises an auxiliary frame fixed to the motor vehicle shell construction, the auxiliary frame being arranged below the longitudinal girders and comprising a front and rear transverse element and respective longitudinal elements, which, in the longitudinal direction of the vehicle, diverge from one another from the back to the front and run at least regionally obliquely to the longitudinal girders of the superstructure. With their respective front end regions, the two longitudinal elements of the auxiliary frame close outwardly—when seen in the vertical direction of the vehicle—when overlapping with the longitudinal girders of the superstructure.

An auxiliary frame for a motor vehicle emerges from DE 10 2008 006 006 A1, which auxiliary frame comprises lateral longitudinal girders running in the longitudinal direction of the vehicle and a plate-like bracing element, which is placed on the auxiliary frame from below and juts out beyond this at least partially on all sides.

Furthermore, an auxiliary frame for a front axis of a motor vehicle emerges from DE 10 2008 006 006 A1, which auxiliary frame is arranged on the base side of the vehicle structure and connected to a front axis crossmember and the vehicle bodywork, wherein the auxiliary frame comprises longitudinal girders set up to diverge from one another, which are connected on the back end—seen in relation to the driving direction—to a plate-shaped bracing element.

As a result of the increasing variety of drive assemblies for motor vehicles, many different construction space situations emerge in the region of the superstructure, whereby the accident behavior of different superstructure arrangements can vary considerably. In particular, until now, frontal collisions with minimal width overlap with the accident partner or the superstructure arrangement with a crash barrier or also an oblique impact on an accident opponent or a crash barrier, in particular with minimal or even no overlap of the bearing superstructure with that of the accident opponent/obstacle, can be brought under control in terms of the accident behavior only with considerable other measures.

An object of the present invention is to create a superstructure arrangement of the kind specified at the start, by means of which its accident behavior, in particular in the event of frontal collisions with minimal or even no overlap of the superstructure with an accident opponent or an obstacle and in the event of an oblique impact of the superstructure on an accident opponent or a different obstacle, can clearly be improved.

The superstructure arrangement according to the invention is characterized in that front end regions of the longitudinal elements of the auxiliary frame jut out beyond the longitudinal girders of the superstructure in the transverse direction of the vehicle on the outside. In other words, the front end regions of the longitudinal elements of the auxiliary frame are arranged in such a way that, in contrast to the prior art, they do not end on the outside overlapping with longitudinal girders of the superstructure based on the transverse direction of the vehicle, but rather the longitudinal elements of the auxiliary frame jut out outwardly beyond the corresponding longitudinal girders of the superstructure in the transverse direction of the vehicle. When seen in the vertical direction of the vehicle, i.e., when seen in a top view of the superstructure of the motor vehicle, the longitudinal elements of the auxiliary frame thus project laterally in the transverse direction of the vehicle. i.e., in the transverse direction of the motor vehicle (y-direction), further outwardly than the laterally respectively allocated longitudinal girders of the superstructure.

As a result of this arrangement, according to the invention, of the front end regions of the longitudinal elements, it is achieved, in particular, that, in the event of frontal collisions of the superstructure with an accident partner or an obstacle with minimal width overlap, yet also even with no width overlap or in the event of an oblique impact on an obstacle or an accident partner, in which the respectively laterally corresponding longitudinal girder is not impacted and is activated, the protection device formed by the front end regions of the longitudinal elements of the auxiliary frame receives impact energy caused by the accident at a very early stage, which, on the one hand, in the event of a deformation of the auxiliary frame, leads to energy absorption and also to a delay of the motor vehicle and, on the other hand, causes the impact energy to be transferred to the auxiliary frame via this and to the longitudinal girders of the superstructure via its connection to the super structure both on the side of the vehicle facing towards the hit and on the side of the vehicle facing away from the hit and, at the same time, an impulse is generated in the transverse direction of the vehicle (y-direction), which moves the vehicle during the collision in the direction of the side of the vehicle facing away from the hit. As a result of the thus improved force reception, on the one hand, the impact energy introduced is absorbed in an improved manner and is moreover used in order to move the vehicle away from the accident opponent or the obstacle, in order to hereby avoid excessive intrusions into the passenger compartment.

In a further design of the invention, it has additionally been shown to be advantageous if the front end regions of the longitudinal elements of the auxiliary frame—when seen in the transverse direction of the vehicle—are arranged at least partially overlapping with a laterally corresponding front wheel of the motor vehicle. In doing so, in particular in the event of a frontal collision with minimal width overlap, in which the front wheel, yet not the longitudinal girder of the superstructure, is indeed impacted and activated by the collision partner, an excessive backwards shifting of the front wheel in the direction of the passenger compartment with an intrusion connected with it is prevented.

Furthermore, it has been shown to be advantageous if the end regions of the of the longitudinal elements of the auxiliary frame—seen in the longitudinal direction of the vehicle—are arranged to at least partially overlap with respective end regions of the crossmember which jut out on the outside in relation to the corresponding longitudinal girders. The longitudinal elements of the auxiliary frame thus complement the function of the end regions of the crossmember, in particular in the event of a frontal collision of the superstructure with an accident partner or an obstacle with minimal width overlap, which crossmember jutting out laterally in relation to the corresponding longitudinal girder, optimally the longitudinal girders of the superstructure.

A further advantageous design of the invention provides that the rear transverse element of the auxiliary frame is formed at least partially by a front axis girder. Thus, this fulfils a dual function, which has a particularly favorable effect on the production costs and the weight of the vehicle.

In this context, it has been shown to be further advantageous if the front axis girder is fixed to the longitudinal girders of the superstructure and in the region of a vehicle base and/or a rear wall of the passenger compartment. In doing so, a particularly favorable support of the front axis girder and thus also the entire auxiliary frame emerges, in order to be able to particularly favorably receive and transfer forces introduced as a result of the accident.

It has been shown to be further advantageous if the front axis girder is formed as a flat support element. The support element has a low weight and, nevertheless, a high degree of stability, in order to be able to receive and transfer forces introduced as a result of the accident particularly favorably.

In a further design of the invention, the front axis girder and the longitudinal elements of the auxiliary frame are formed as separate components, which are connected to one another via respective joining connections and/or mechanical connection means. In doing so, a construction unit is created that is particularly favorable in terms of manufacturing technology and costs.

Furthermore, it has been shown to be advantageous if the auxiliary frame forms a lower longitudinal girder plane below the main longitudinal girder plane of the longitudinal girders. In this way, forces introduced as a result of the accident can be received particularly favorably via several load planes.

Finally, it has been shown to be advantageous if the front transverse element of the auxiliary frame is fixed to the longitudinal girders via respective retaining consoles. Thus, a corresponding support of the auxiliary frame on the superstructure is optimally achieved, such that, in the event of a force supply caused by the accident, for example, the auxiliary frame cannot collapse due to buckling or similar.

Further advantages and details of the invention emerge from the below description of preferred exemplary embodiments and by means of the drawings.

BRIEF DESCRIPTION OF THE DRAWINGS

FIG. 3 is a side view of the superstructure arrangement according to FIGS. 1 and 2, wherein the altitude of the auxiliary frame, in particular, can be seen below the superstructure;

FIGS. 4a and 4b are a top view and a view from below of a superstructure arrangement for a motor vehicle shell construction analogously to FIG. 1 or 2; and FIGS. 5a and 5b are espective side views of the superstructure arrangement according to FIGS. 4a and 4b with depicted front wheel or when the front wheel is left out.

DETAILED DESCRIPTION OF THE DRAWINGS

Figure 1:
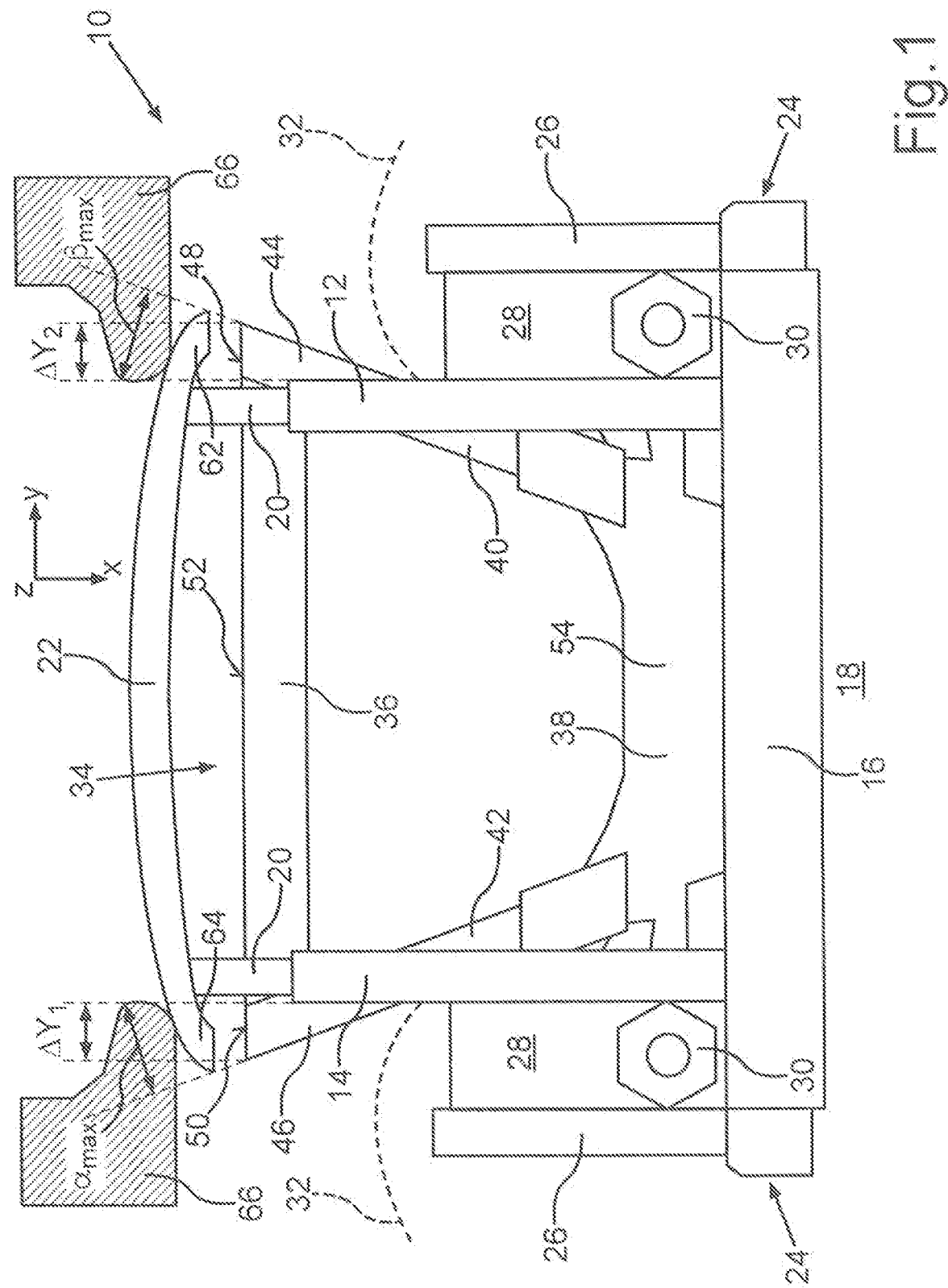
FIG. 1 shows, in a schematic depiction, a top view of an exemplary embodiment of the superstructure arrangement according to the invention for a motor vehicle shell construction having a superstructure, which comprises two longitudinal girders that extend in the longitudinal direction of the vehicle and are connected to each other via a crossmember, and an auxiliary frame arranged on the superstructure below the longitudinal girders, the auxiliary frame comprising respective longitudinal elements, which diverge from one another from the back to the front in the longitudinal direction of the vehicle and comprise respective front end regions, which jut out in relation to the longitudinal girders of the superstructure on the outside in the transverse direction of the vehicle.

In the figures, the same or functionally identical elements are provided with the same reference numerals.

Figure 2:
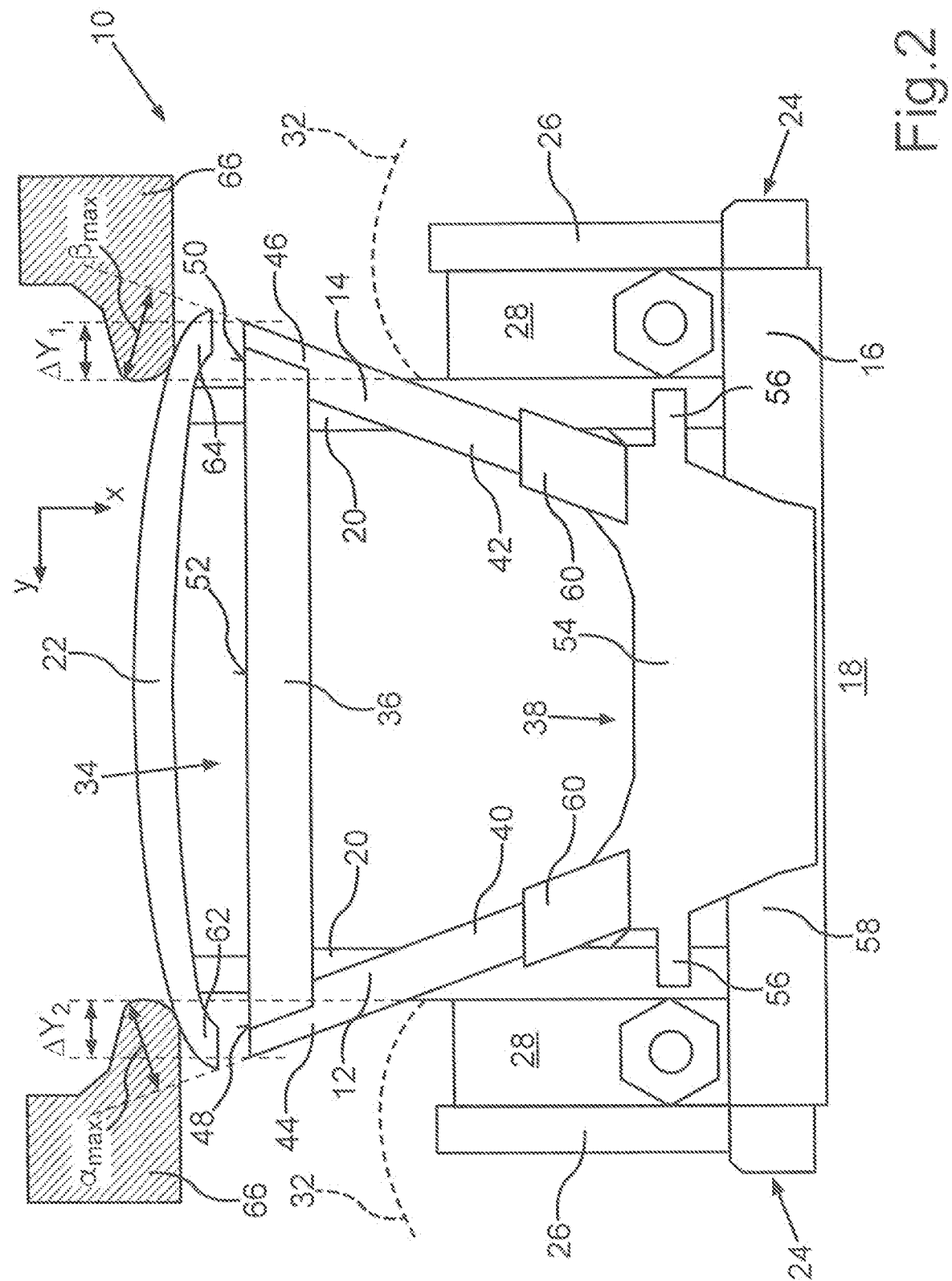
FIG. 2 is a view from below of the superstructure arrangement according to FIG. 1.

In FIGS. 1 to 3, a superstructure arrangement for a passenger vehicle is depicted in a top view and a side view. Respective main longitudinal girders 12, 14 can be seen substantially from a superstructure 10, the main longitudinal girders extending from the back to the front in the longitudinal direction of the vehicle (x-direction) starting from a front rear wall 16 of a passenger compartment 18 exactly or at least approximately in parallel to one another. In another advantageous exemplary embodiment of the superstructure arrangement, the longitudinal girders, which are often also referred to as main longitudinal girders, can be arranged in a slightly V-shaped arrangement and thus run so as to diverge from one another.

The two longitudinal girders 12, 14 have respective energy absorption elements 20 on their front ends, via which energy absorption elements the two longitudinal girders 12, 14 are connected to a crossmember 22. The crossmember 22 is presently formed as a bumper crossmember which, according to an advantageous embodiment of the superstructure arrangement, is here allocated to a front module together with the energy absorption elements 20, the front module being fixed on the front ends of the longitudinal girders 12, 14.

From the motor vehicle shell construction, respective side walls 24 are furthermore depicted in the region of corresponding door pillars (A-pillars), which are connected to the rear wall 16. Upper longitudinal girders 26 of an upper longitudinal girder plane $Z_o$ are also supported on the rear wall 16, the longitudinal girders being arranged in the region of shell components 28 and shock-absorber domes 30 and there extending in the longitudinal direction of the vehicle (x-direction). The upper longitudinal girders 26 are connected to the main longitudinal girders 12, 14 via the shell components 28. As indicated in the Figures, the shell components 28 are integrated in the respective shock-absorber dome 30 or strut mounts for the corresponding front wheels 32 indicated by dashed lines.

Along with the superstructure 10, the superstructure arrangement comprises an auxiliary frame 34, which, as can be seen in particular in FIG. 3, extends in a lower longitudinal girder plane $Z_U$ below the longitudinal plane $Z_M$ with the longitudinal girders 12, 14.

Here, it can be seen from FIGS. 1 and 2, in particular, that the auxiliary frame 34 comprises a front transverse element 36 and a rear transverse element 38 as well as respective longitudinal elements 40, 42, which here continuously diverge from one another from the back to the front in the longitudinal direction of the vehicle (x-direction). This means that the two longitudinal elements 40, 42, which each substantially extend in a straight line, together run diverging from each other in a V-shaped arrangement. As a result of the course of the two longitudinal elements 40, 42 of the auxiliary frame 34, these also run at least regionally obliquely in relation to the longitudinal girders 12, 14 of the superstructure 10 or cross this in a central longitudinal region in the longitudinal direction of the vehicle (x-direction) when seen, for example, at the height of the front end of the respectively laterally corresponding shell component 28.

As a result of the oblique course of the two longitudinal elements 40, 42 diverging towards the front, these respectively corresponding front end regions 44, 46 jut out beyond the longitudinal girders 12, 14 or their front end regions on the outer side in the transverse direction of the vehicle (y-direction), that is by a respective amount $\Delta Y_1$ or $\Delta Y_2$. The two end regions 44, 46 of the longitudinal elements 38, 40 here have respective front end faces 48, 50, which here in this exemplary embodiment run substantially and thus ideally in parallel to a y-z plane extending in the transverse direction of the vehicle (y-direction) or in the vertical direction of the vehicle (z-direction). In a different exemplary embodiment of the superstructure arrangement, the end faces 48, 50 can also run obliquely in relation to the plane mentioned above. As can be seen from the figures, the end faces 48, 50 here extend on a plane or—in relation to the longitudinal direction of the vehicle (x-direction)—on a level with a front side 52 of the front transverse element 36. The front side 52 of the transverse element 36 consequently closes, presently flushly with the end faces 48, 50 of the two longitudinal elements 40, 42. The separation from the longitudinal elements could also lie on the rear edge of the transverse element.

It can be seen in FIG. 2 that the rear transverse element 38 of the auxiliary frame 34 is presently formed by a front axis girder 54, which, for its part, is fixed on a vehicle base 58 or on the front rear wall 16, which transitions into the vehicle base 58 in the region of a pedal base, with the use of respective fixing points 56 on the laterally respectively corresponding longitudinal girder 12, 14 of the superstructure 10 and in a backward region. Thus, an additional connection between the superstructure 10 and the base group of the vehicle can be carried out via the front axis girder 54.

In the present case, the front axis girder 54 is formed as a flat support element, which can be produced, for example, to have multiple layers made of sheet metal components or also in a cast construction. The front axis girder 54 and the longitudinal elements 40, 42 of the auxiliary frame 34 are here formed as separate components, which are connected to one another via respective joining connections and/or mechanical connection means, for example here respective attachments 60.

In particular, it can be seen from FIGS. 1 and 2 that the end regions 44, 46 of the longitudinal elements 40, 42 of the auxiliary frame 34 jut out by a roughly identical amount, i.e., the amount $\Delta Y_1$ or $\Delta Y_2$, outwardly beyond the longitudinal girders 12, 14 in relation to the transverse direction of the vehicle (y-direction). Here, when seen in the longitudinal direction of the vehicle (x-direction), the end regions 44, 46 of the longitudinal elements 40, 42 are at least partially overlapping with the end regions 62, 64 of the transverse girder 22 jutting out on the outside in the transverse direction of the vehicle (y-direction). Here, the end regions 62, 64 of the transverse girder 22 extend at the height of the central longitudinal plane $Z_M$ and the end regions 44, 46 of the longitudinal elements 40, 42 at the height of the lower longitudinal girder plane $Z_U$, which means that the transverse girder 22 and thus also its end regions 62, 64 have a height offset in relation to the longitudinal elements 40, 42 of the longitudinal elements of the auxiliary frame.

The longitudinal elements 40, 42 here extend at an angle $\alpha_{max}$ or $\beta_{max}$ in relation to the corresponding longitudinal girders 12, 14.

In the event of a frontal collision of the motor vehicle or the superstructure arrangement with a respective obstacle 66 depicted in FIGS. 1 and 2 with minimal width overlap, in which the correspondingly laterally allocated end region 62, 64 of the crossmember 22 is impacted by the obstacle 66, yet not the laterally corresponding longitudinal girder 12, 14 of the central longitudinal girder plane $Z_M$, it is achieved that the obstacle 66 is absorbed after the collapsing or giving way or the respective end region 62, 64 of the crossmember 22 by the laterally corresponding end region 44, 46, arranged behind it, of the corresponding longitudinal element 40, 42 of the auxiliary frame 34. In contrast to the previous prior art, a protection device is thus created with the longitudinal elements 40, 42 of the auxiliary frame 34, by means of which protection device collisions of the superstructure 10 with minimal width overlap with the corresponding obstacle 66 lead to this not excessively penetrating into the superstructure 10 or being able to impact on the front wheel 32, without the load-receiving and load-distributing end region 44, 46 of the respective longitudinal element 40, 42 being impacted and supplied.

The respective end region 44, 46 of the longitudinal element 40, 42 of the auxiliary frame 34 is here arranged at least partially overlapping with the respectively laterally corresponding front wheel 32, such that, upon penetration into the superstructure 10, the respective front wheel 32 cannot be impacted in an unimpeded manner. A further advantage is that collision objects impacting in a laterally offset manner, such as the respective obstacle 66, which would not impact and activate the central front longitudinal girder 12, 14 in the event of a collision, can be delayed in good time by the longitudinal elements 40, 42 at the height of the lower longitudinal girder plane $Z_O$ and, via this, the collision energy on the crossmember 36 and the front axis girder 54 and, via its attachment, both on the side of the vehicle facing towards the hit and on the side of the vehicle facing away from the hit is transferred to the central front longitudinal girder 12, 14 and, at the same time, an impulse is generated in the transverse direction of the vehicle (y-direction), which moves the passenger compartment to the side facing away from the hit. As a result, considerable intrusions into the passenger compartment can be avoided by means of these measures, indeed in particular in the event of frontal collisions with the obstacle 66 with minimal width overlap.

In FIGS. 4a and 4b, a superstructure arrangement implemented directly on a motor vehicle shell construction can be seen in a top view and a view from below, as has been explained in the context of FIGS. 1 to 3. FIGS. 5a and 5b here show respective lateral views of this superstructure with corresponding front wheel 32 or when the front wheel has been left out, wherein a wheel well cladding 68 can be seen in FIGS. 4a and 4b.

What is claimed is:

1. A superstructure arrangement of a motor vehicle shell construction of a motor vehicle, comprising:
    a superstructure (10) which includes a first longitudinal girder (12) and a second longitudinal girder (14) running in a longitudinal direction of the motor vehicle, wherein the first and second longitudinal girders (12, 14) are connected to each other indirectly via a crossmember (22) on a respective front end of the first and second longitudinal girders (12, 14); and
    an auxiliary frame (34) fixed on the motor vehicle shell construction, wherein the auxiliary frame is disposed below the first and second longitudinal girders (12, 14) and includes a front transverse element (36), a rear transverse element (38), a first longitudinal element (40), and a second longitudinal element (42), wherein the first and second longitudinal elements (40, 42) each extend in a straight line and continuously diverge from each other in a V-shaped arrangement from the rear transverse element (38) to the front transverse element (36), wherein the first longitudinal element (40) crosses the first longitudinal girder (12) in a central longitudinal region of the first longitudinal element (40), and wherein the second longitudinal element (42) crosses the second longitudinal girder (14) in a central longitudinal region of the second longitudinal element (42);

wherein a first front end region (44) of the first longitudinal element (40) juts out beyond the first longitudinal girder (12) on a first outside in a transverse direction of the motor vehicle and wherein a second front end region (46) of the second longitudinal element (42) juts out beyond the second longitudinal girder (14) on a second outside in the transverse direction of the motor vehicle.

2. The superstructure arrangement according to claim 1, wherein, as seen in the transverse direction of the motor vehicle, the first front end region (44) of the first longitudinal element (40) is disposed at least partially overlapping with a lateral first front wheel of the motor vehicle, and the second front end region (46) of the second longitudinal element (42) is disposed at least partially overlapping with a lateral second front wheel of the motor vehicle.

3. A superstructure arrangement of a motor vehicle shell construction of a motor vehicle, comprising:
  a superstructure (10) which includes a first longitudinal girder (12) and a second longitudinal girder (14) running in a longitudinal direction of the motor vehicle, wherein the first and second longitudinal girders (12, 14) are connected to each other indirectly via a crossmember (22) on a respective front end of the first and second longitudinal girders (12, 14); and
  an auxiliary frame (34) fixed on the motor vehicle shell construction, wherein the auxiliary frame is disposed below the first and second longitudinal girders (12, 14) and includes a front transverse element (36), a rear transverse element (38), a first longitudinal element (40), and a second longitudinal element (42), wherein the first and second longitudinal elements (40, 42) diverge from each other from a back to a front in the longitudinal direction of the motor vehicle, wherein the first longitudinal element (40) runs at least regionally obliquely to the first longitudinal girder (12), and wherein the second longitudinal element (42) runs at least regionally obliquely to the second longitudinal girder (14);

wherein a first front end region (44) of the first longitudinal element (40) juts out beyond the first longitudinal girder (12) on a first outside in a transverse direction of the motor vehicle and wherein a second front end region (46) of the second longitudinal element (42) juts out beyond the second longitudinal girder (14) on a second outside in the transverse direction of the motor vehicle;

wherein, as seen in the longitudinal direction of the motor vehicle, the first end region (44) of the first longitudinal element (40) is disposed at least partially overlapping with a first end region (62) of the crossmember (22) jutting out on the first outside in relation to the first longitudinal girder (12), and the second end region (46) of the second longitudinal element (42) is disposed at least partially overlapping with a second end region (64) of the crossmember (22) jutting out on the second outside in relation to the second longitudinal girder (14).

4. The superstructure arrangement according to claim 1, wherein the rear transverse element (38) of the auxiliary frame (34) is formed at least partially by a front axis girder (54).

5. The superstructure arrangement according to claim 4, wherein the front axis girder (54) is fixed on the first and second longitudinal girders (12, 14) and in a region of a vehicle base (58) and/or a rear wall (16) of a passenger compartment (18) of the motor vehicle.

6. The superstructure arrangement according to claim 4, wherein the front axis girder (54) is a flat support element.

7. The superstructure arrangement according to claim 4, wherein the front axis girder (54) and the first and second longitudinal elements (40, 42) are formed as separate components which are connected to one another via respective joining connections and/or mechanical connections.

8. The superstructure arrangement according to claim 1, wherein the auxiliary frame (34) forms a lower longitudinal girder plane ($Z_U$) below a main longitudinal girder plane ($Z_M$) of the first and second longitudinal girders (12, 14).

9. The superstructure arrangement according to claim 1, wherein the front transverse element (36) of the auxiliary frame (34) is fixed on the first and second longitudinal girders (12, 14) via respective retaining consoles.

* * * * *